US008014039B2

(12) United States Patent
Nohtomi (10) Patent No.: US 8,014,039 B2
(45) Date of Patent: Sep. 6, 2011

(54) DOCUMENT MANAGEMENT SYSTEM, A DOCUMENT MANAGEMENT METHOD, AND A DOCUMENT MANAGEMENT PROGRAM

(75) Inventor: Kazufumi Nohtomi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 981 days.

(21) Appl. No.: 11/926,895

(22) Filed: Oct. 29, 2007

(65) Prior Publication Data

US 2008/0117472 A1 May 22, 2008

(30) Foreign Application Priority Data

Nov. 17, 2006 (JP) ................................. 2006-311770

(51) Int. Cl.
*H04N 1/00* (2006.01)

(52) U.S. Cl. ...... 358/403; 358/1.15; 358/442; 358/1.16; 709/201; 709/203; 379/88.03; 379/100.1

(58) Field of Classification Search ................ 358/1.15, 358/403, 442, 400, 401, 404, 1.16; 709/201, 709/203, 223, 250, 246, 277, 204, 208; 379/1.01, 379/100.1, 211.01, 100.08, 100.09, 88.03
See application file for complete search history.

(56) References Cited

U.S. PATENT DOCUMENTS

| | | | | |
|---|---|---|---|---|
| 7,254,606 B2 * | 8/2007 | Hamada | | 709/203 |
| 7,271,928 B2 * | 9/2007 | Naito et al. | | 358/1.15 |
| 7,437,366 B2 * | 10/2008 | Matsuzawa et al. | | 1/1 |
| 7,567,360 B2 * | 7/2009 | Takahashi et al. | | 358/1.15 |
| 7,612,921 B2 * | 11/2009 | Okabe et al. | | 358/403 |
| 7,676,512 B2 * | 3/2010 | Yamamoto et al. | | 707/608 |
| 7,774,853 B2 * | 8/2010 | Yoshida | | 726/28 |
| 7,831,583 B2 * | 11/2010 | Kojima | | 707/706 |
| 7,836,145 B2 * | 11/2010 | Taguchi et al. | | 709/214 |
| 2005/0024679 A1 * | 2/2005 | Yoda et al. | | 358/1.15 |
| 2005/0131907 A1 * | 6/2005 | Matsuzawa et al. | | 707/10 |
| 2005/0195430 A1 * | 9/2005 | Shinohara et al. | | 358/1.15 |
| 2006/0044605 A1 * | 3/2006 | Schneider et al. | | 358/1.15 |
| 2006/0114485 A1 * | 6/2006 | Sato | | 358/1.13 |
| 2006/0139685 A1 * | 6/2006 | Hayashi | | 358/1.15 |
| 2006/0200867 A1 * | 9/2006 | Yoshida | | 726/27 |
| 2007/0242299 A1 * | 10/2007 | Kobayashi et al. | | 358/1.13 |
| 2007/0265994 A1 * | 11/2007 | Ueda | | 707/1 |
| 2008/0198421 A1 * | 8/2008 | Hirahara et al. | | 358/403 |
| 2009/0271872 A1 * | 10/2009 | Ishizuka et al. | | 726/28 |

FOREIGN PATENT DOCUMENTS

| | | |
|---|---|---|
| JP | 2000-89997 | 3/2000 |
| JP | 2001-358882 | 12/2001 |
| JP | 2006-338213 | 12/2006 |

* cited by examiner

*Primary Examiner* — Negussie Worku

(74) *Attorney, Agent, or Firm* — Oblon, Spivak, McClelland, Maier & Neustadt, L.L.P.

(57) ABSTRACT

A document management system, a document management method, and a document management program for managing document data generated by scanning are disclosed.

The document management system includes a scanning unit for reading a document and generating image data, an image data storing unit for storing a scanned image file, and a document management server that includes a destination folder for storing the scanned image file and a file name conversion table. A code attached to the document is acquired by one of a code converting process, an OCR process, and a code inputting process. A file name is generated based on the acquired code. The scanned image file is acquired from the image data storing unit, the destination folder and attribute information are acquired by converting characters of the file name using the file name conversion table such that the scanned image file is stored in the destination folder with the attribute information associated.

20 Claims, 6 Drawing Sheets

DOCUMENT MANAGEMENT SYSTEM, A DOCUMENT MANAGEMENT METHOD, AND A DOCUMENT MANAGEMENT PROGRAM

BACKGROUND OF THE INVENTION

1. Field of the Invention

The present invention relates to a document management system, a document management method, and a document management program for managing document data generated by scanning.

2. Description of the Related Art

Techniques of electronic processing of various documents, such as drawings and text, are progressing, wherein the documents are often stored as image data by a document management system. For example, when a paper document is registered into the document management system, the following process is performed. First, the paper document is scanned, and an electronic file is generated and stored in a predetermined folder of a client terminal. Then, a file name of the electronic file is changed into a document number, a drawing number, a product number, and the like using the client terminal. Then, a destination folder of the document management system is selected for storing the document, and the document is stored accordingly. Furthermore, the document management system provides an attribute item (bibliography matters) required for searching.

Further, for example, Patent Reference 1 discloses an image reading apparatus for transmitting image data of printed matter (medium) scanned and electronically processed to a destination. According to the technique given by Patent Reference 1, a digital multifunction machine is connected to a host computer and a terminal unit through a LAN. There, a CPU generates a folder in a storing unit according to directions from the terminal unit. When a user pushes a "save" key prepared in the multifunction machine, a destination folder, in which the image data of the document are to be stored, is specified. The document is scanned by a scanning unit, and an image-processing unit performs an image process on the image data. The processed image data are saved in the destination folder specified by the user.

Further, for example, Patent Reference 2 discloses a technique of a document management system wherein an electronic document is stored for searching and reuse without a filing work. According to the technique, a scanner apparatus, a printer, and a facsimile terminal apparatus on an intranet store an electronic document to be processed in a HDD of a storage unit associating the electronic document with registration IDs of each apparatus. Then, the registration ID, a storage address, and ID information of the electronic document are provided to a server apparatus, and the electronic document is stored so that it can be searched for by a PC.

[Patent Reference 1] JPA 2001-358882
[Patent Reference 2] JPA 2000-89997

DISCLOSURE OF INVENTION

Objective of Invention

As described above, it is convenient that the image data obtained by scanning are stored in the predetermined destination folder. Further, by storing with an ID being associated, searching for the document data is facilitated.

However, if detailed searching and detailed document classification are desired, appropriate folder management is required.

Further, the operation of assigning a file name and defining attribute information every time scanning is performed with the client terminal or the multifunction machine, as applicable, is troublesome. Further, it is also troublesome to determine a storing destination and store the document at the destination for every file.

On the other hand, filing can be automated; however, when an error is made in classification and identification, an original document may be deleted, and confusion may be caused by duplicated files.

SUMMARY OF THE INVENTION

The present invention provides a document management system, a document management method, and a document management program that substantially obviate one or more of the problems caused by the limitations and disadvantages of the related art.

Specifically, the present invention provides a document management system, a document management method, and a document management program for appropriately and efficiently managing document data generated by scanning, thereby solving the problems.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by a document management system, a document management method, and a document management program particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides a document management system, a document management method, and a document management program as follows.

Means for Solving the Problem

An aspect of the embodiment of the present invention provides a document management system that includes a scanning unit for reading a document and generating image data, an image data storing unit for storing a scanned image file, and a document management server that includes a destination folder for storing the scanned image file, and a file name conversion table. A document identifier assigned to this document is acquired from the image data generated by the scanning unit, a file name is assigned to the image data based on the document identifier, and the document is stored in the image data storing unit as a scanned image file. Further, the document management server acquires the scanned image file stored in the image data storing unit, specifies a destination folder based on the document identifier contained in the file name of the scanned image file using the file name conversion table, and stores the scanned image file in the destination folder.

According to another aspect of the embodiment, the scanning unit of the document management system acquires the document identifier by specifying a code such as a bar code on the image of the document, and performing code conversion.

According to another aspect of the embodiment, the scanning unit of the document management system acquires the document identifier by specifying a character on the image of the document, and by performing character recognition.

According to another aspect of the embodiment, the document management server of the document management system generates a new destination folder, if a destination folder cannot be specified based on the document identifier contained in the file name.

According to another aspect of the embodiment, if a file name is duplicated in the destination folder, the document management server of the document management system adds an error flag showing the duplication to the scanned image file, and stores the scanned image file after changing the file name.

According to another aspect of the embodiment, the document management server of the document management system acquires attribute information based on the document identifier contained in the file name of the scanned image file using the file name conversion table, and stores the scanned image file in association with the attribute information.

An aspect of the embodiment of the present invention provides a document management method using the document management system that includes a scanning unit for reading a document and generating image data, an image data storing unit for storing a scanned image file, and a document management server that includes a destination folder for storing the scanned image file, and a file name conversion table. A document identifier assigned to this document is acquired using the image data generated by the scanning unit, a file name is assigned to the image data based on the document identifier, and the document is stored in the image data storing unit as a scanned image file. Further, the document management server acquires the scanned image file stored in the image data storing unit, specifies a destination folder based on the document identifier contained in the file name of the scanned image file using the file name conversion table, and stores the scanned image file in the destination folder.

An aspect of the embodiment of the present invention provides a document management program for managing a document using the document management system that includes a scanning unit for reading a document and generating image data, an image data storing unit for storing a scanned image file, and a document management server that includes a destination folder for storing the scanned image file and a file name conversion table. A document identifier assigned to this document is acquired using the image data generated by the scanning unit, a file name is assigned to the image data based on the document identifier, and the document is stored in the image data storing unit as a scanned image file. Further, the document management server acquires the scanned image file stored in the image data storing unit, specifies a destination folder based on the document identifier contained in the file name of the scanned image file using the file name conversion table, and stores the scanned image file in the destination folder.

(Effect)

According to the embodiment of the present invention, the scanning unit acquires the document identifier of the document using the generated image data, assigns a file name generated based on the document identifier to the image data, and stores the document in the image data storing unit as a scanned image file. Further, the document management server acquires the scanned image file stored in the image data storing unit, and specifies a destination folder based on the document identifier contained in the file name of the scanned image file using the file name conversion table. Then, the scanned image file is stored in the destination folder. In this way, a user can efficiently file image data.

According to the embodiment of the present invention, the scanning unit specifies the bar code on the image of a document, and acquires a document identifier by performing code conversion. In this way, the user can efficiently assign the file name.

According to the embodiment of the present invention, a character on the image of a document is specified and a document identifier is acquired by performing character recognition. In this way, the user can efficiently assign a file name.

According to the embodiment of the present invention, the document management server generates a new destination folder, if a destination folder cannot be specified based on the document identifier contained in the file name. In this way, the user can efficiently perform filing.

According to the embodiment of the present invention, if duplication of the same file name is detected in a destination folder, the document management server adds an error flag showing duplication to the scanned image file, changes the file name, and stores the scanned image file. In this way, a process of specifying and correcting a scanned image file can be performed.

According to the embodiment of the present invention, attribute information is acquired using a file name conversion table based on the document identifier contained in the file name of a scanned image file, and the scanned image file is stored in association with the attribute information. In this way, the scanned image file can be searched for using the attribute information.

Effectiveness of Invention

According to the present invention, document data generated by scanning are precisely and efficiently managed.

DESCRIPTION OF THE PREFERRED EMBODIMENTS

In the following, embodiments of the present invention are described with reference to the accompanying drawings. The embodiments are described as a document management system, a document management method, and a document management program for efficiently and precisely managing document data generated by scanning.

Figure 1:
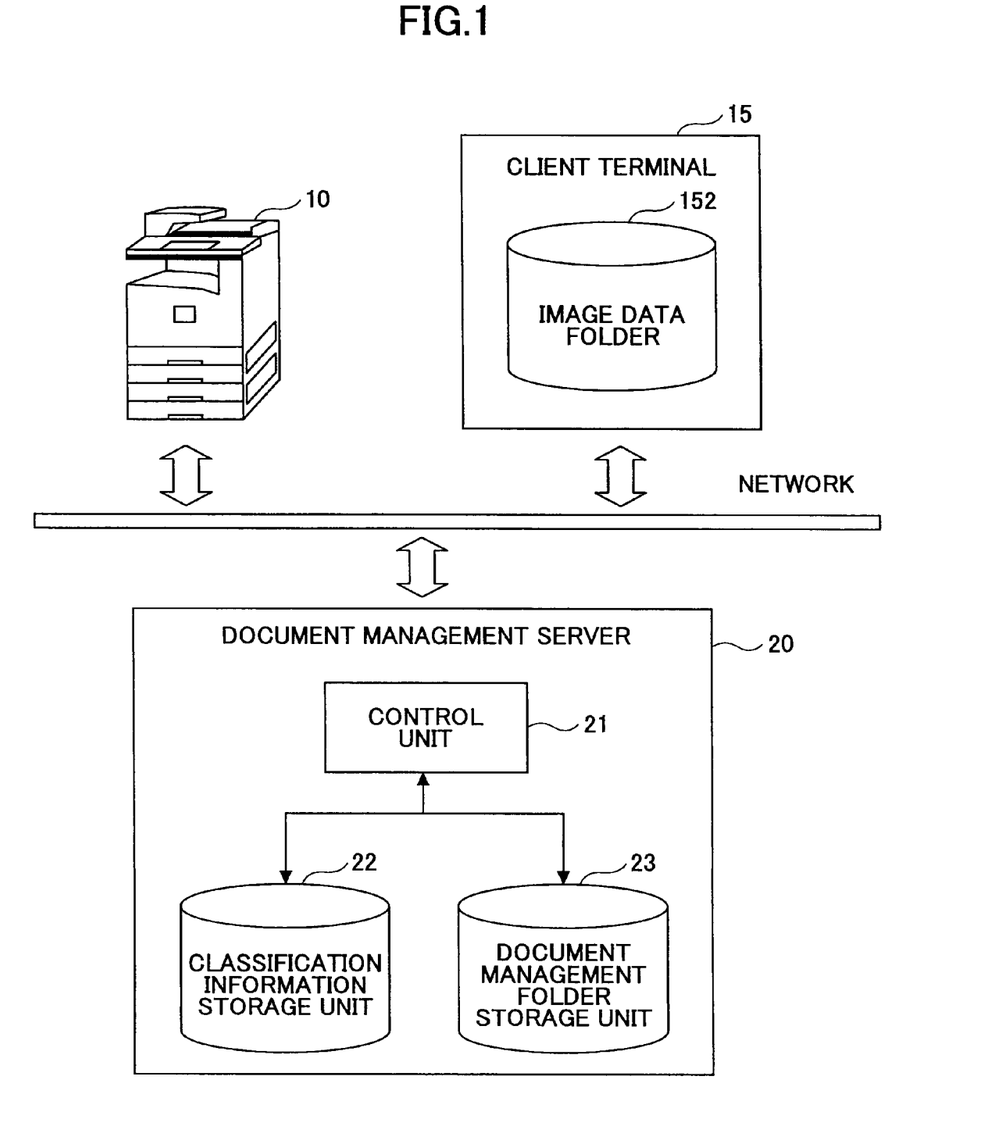
FIG. 1 is a schematic diagram of a system according to an embodiment of the present invention.

As shown in FIG. 1, a system according to the embodiment includes a multifunction machine 10, a client terminal 15, and a document management server 20 that are connected through a network.

Figure 2:
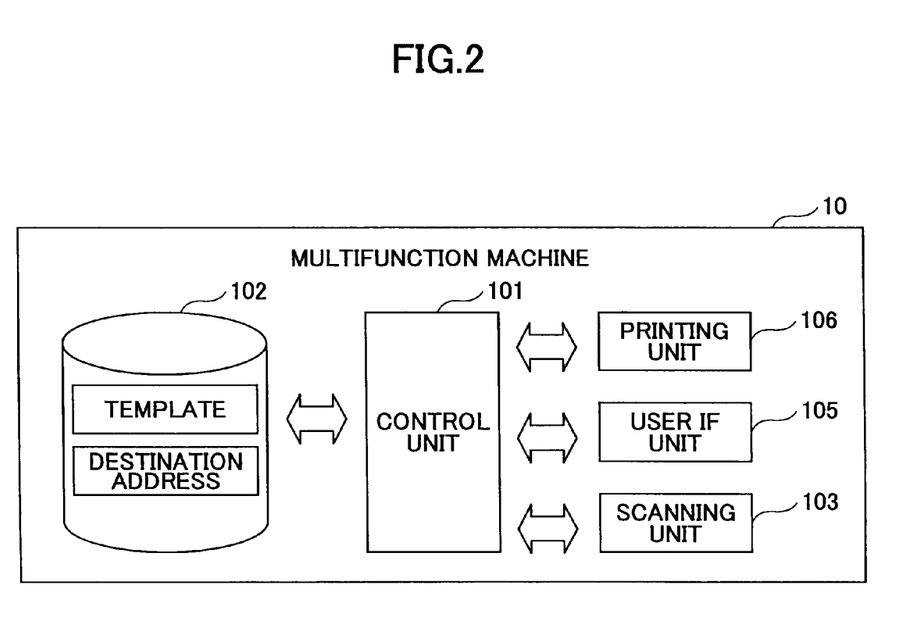
FIG. 2 is a block diagram of a multifunction machine.

The multifunction machine 10 provides functions including a printing function and a copying function. The multifunction machine 10 includes a control unit 101, a storage unit 102, a scanning unit 103, a user IF unit 105, and a printing unit 106 as shown in FIG. 2. With the configuration as above, the multifunction machine 10 functions as a scanner, generates a scanned image file, and performs a process of transmitting the scanned image file.

This control unit 101 performs a process of generating the scanned image file and a process of transmitting the scanned image file. Specifically, a step of acquiring a document identifier, a step of storing the scanned image file in an image data storing unit, a step of code-conversion, a step of character recognition, and the like, are performed. By executing a scanning execution program, the control unit 101 serves as a document identifier acquiring unit, a functional unit for storing the scanned image file in the image data storing unit, a code-conversing unit, a character-recognizing unit, and the like.

The storage unit 102 stores a template database and destination address data, and temporarily stores data obtained by scanning. The printing unit 106 is used for printing and copying. The user IF unit 105 includes a display unit, and an operation console. The scanning unit 103 is for optically reading a document when a copying service and a scanning service are used.

The template database includes data about an image pattern of a format of the document scanned by the multifunction machine 10. By using the image pattern, whether the character-recognition process as described later is necessary is determined, and a target domain for character recognition is defined. For this purpose, the template database includes an image pattern for specifying a document that can be OCR processed, and location data for specifying the target domain for character recognition for every template.

The client terminal 15 is a computer terminal used by an administrator who manages the document management server 20. The client terminal includes a controlling unit (further including a CPU, a RAM, a ROM, and a hard disk), a display unit, and an operating console including a keyboard and a pointing device.

The client terminal 15 includes a hard disk storage for providing an image data folder 152 for storing image data. A scanned image file generated by the multifunction machine 10 is temporarily stored in the image data folder 152. Each scanned image file stored in the image data folder 152 is associated with a file name assigned by the multifunction machine 10.

The document management server 20 is a server computer for managing various document files including scanned image files generated by the multifunction machine 10. The document management server 20 includes a control unit 21, a classification information storage unit 22, and a document management folder storage unit 23.

The control unit 21 includes a control unit (CPU), and a storing unit (RAM, ROM, etc.) for performing processes as described below. The processes include a scanned image file acquiring step, a destination folder specifying step, a scanned image file storing step, a new destination folder generating step, a file name changing step, and a process of acquiring and storing attribute information. By performing a document management program for this purpose, the control unit 21 functions as a scanned image file acquiring unit, a destination folder specifying unit, a scanned image file storing unit, a new destination folder generating unit, a file name changing unit, and a unit for acquiring and for storing the attribute information.

The classification information storage unit 22 stores the file name conversion table that is used when changing the file name for specifying a destination folder, wherein the file is to be stored, and for specifying the attribute information. Storing into the file name conversion table is carried out when a scanned image file to be stored in the document management folder storage unit 23 is determined. According to the embodiment, a code serving as the document identifier is assigned to each document, and the code is attached to a bar code and a character.

Figure 3:
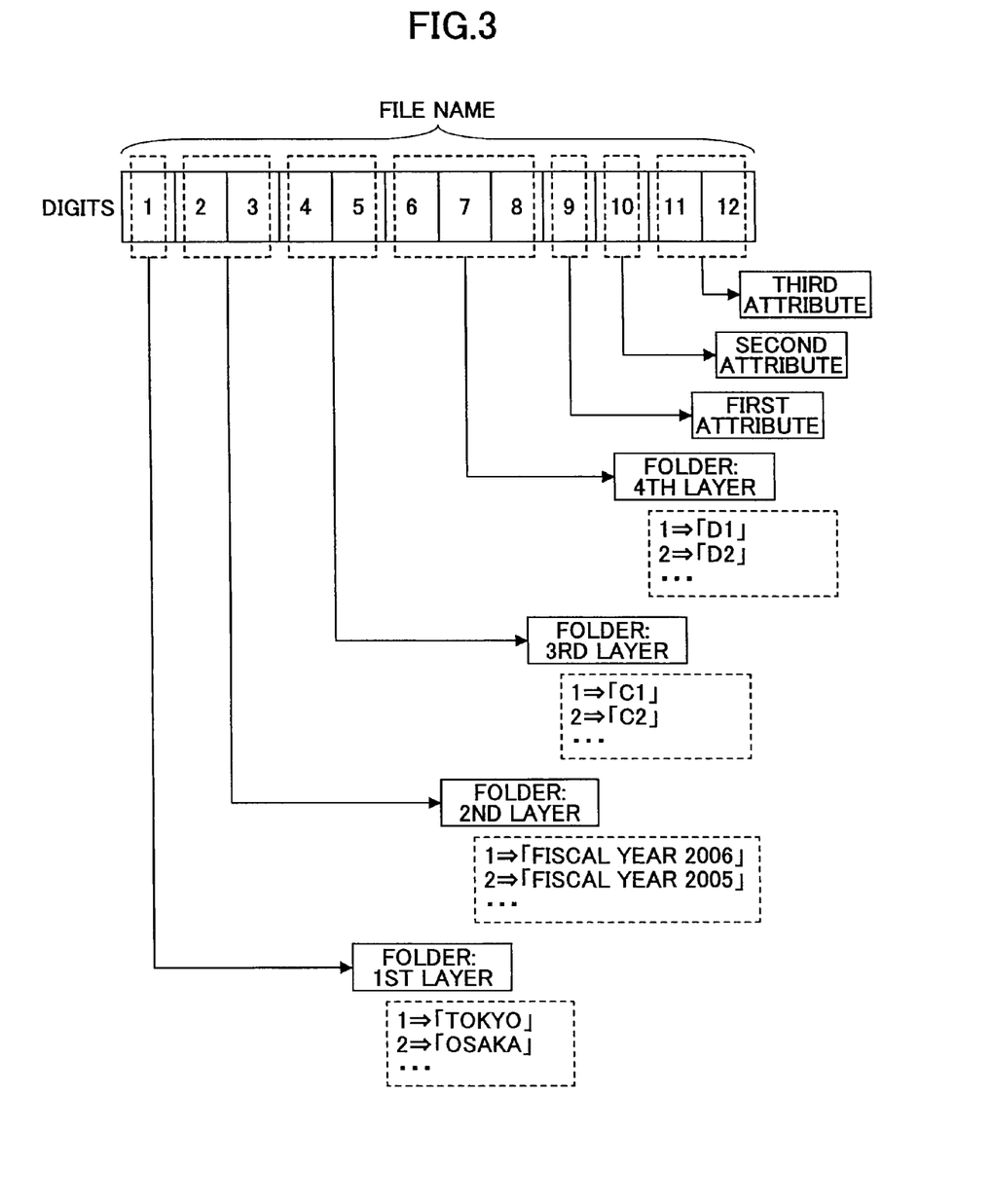
FIG. 3 is a schematic diagram for explaining a file name conversion table stored in a classification information storage unit.

The code, constituting the file name, stored in the file name conversion table is structured as shown in FIG. 3; that is, the code contains data for specifying a destination folder and attributes. Specifically, each subset of the data is stored in one or more predetermined digits of the code.

Figure 4:
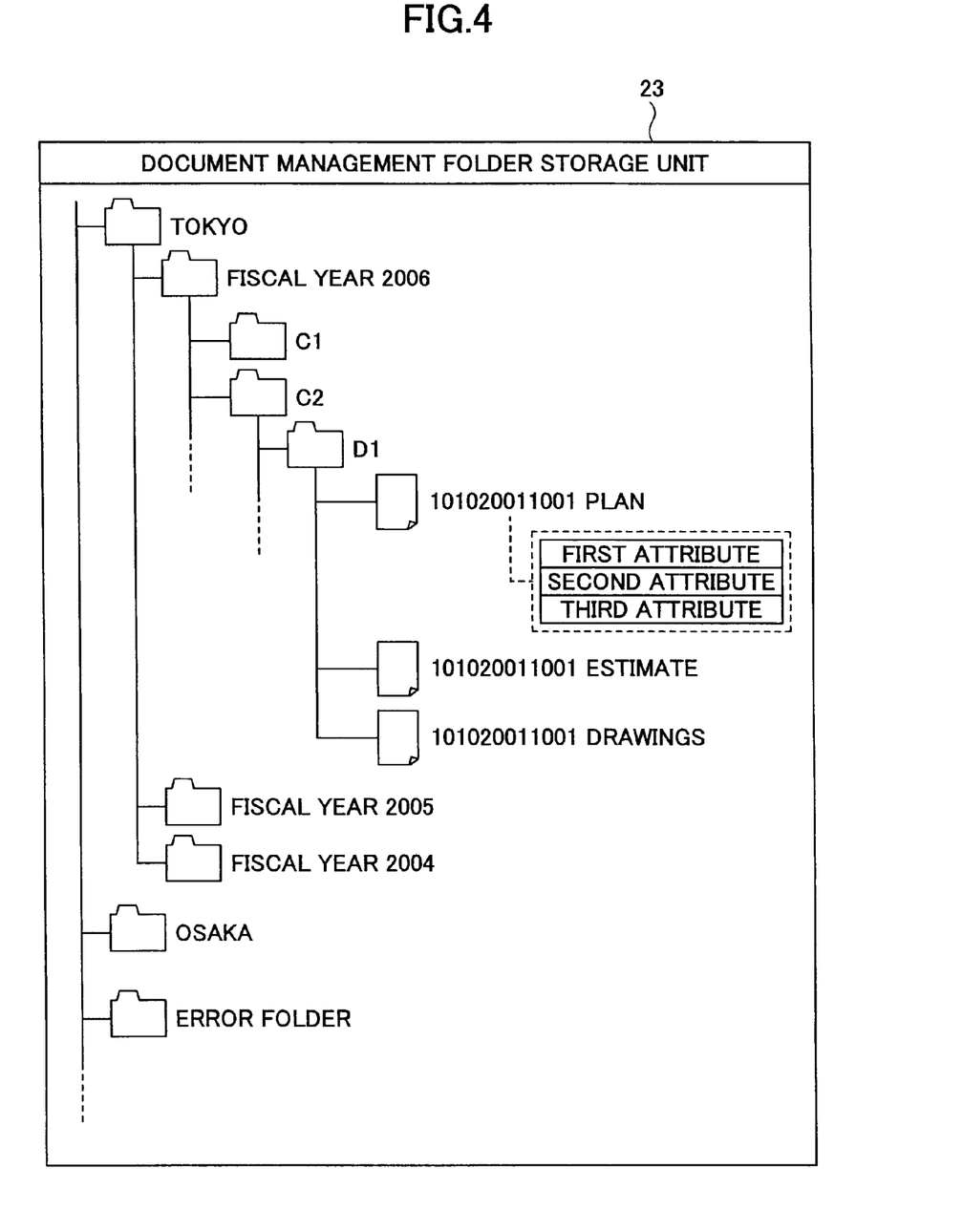
FIG. 4 is a schematic diagram for explaining data stored in a document management folder storage unit.

The document management folder storage unit 23 provides a folder for storing various document files including a scanned image file according to a tree folder configuration as shown in FIG. 4. The folder configuration is generated by a process performed by the control unit 21 and by operations of the client terminal 15. The file and the folder stored in the document management folder storage unit 23 can be specified with a path for specifying a storage location. According to the embodiment, the document files are stored in one of the folders belonging to the lowest layer.

Next, a process of performing document registration by the system is described with reference to FIGS. 5 and 6. Here, a file generating process performed by the multifunction machine 10 is described with reference to FIG. 5, and a file registration process performed by the document management server 20 is described with reference to FIG. 6.

(File Generation Process)

Figure 5:
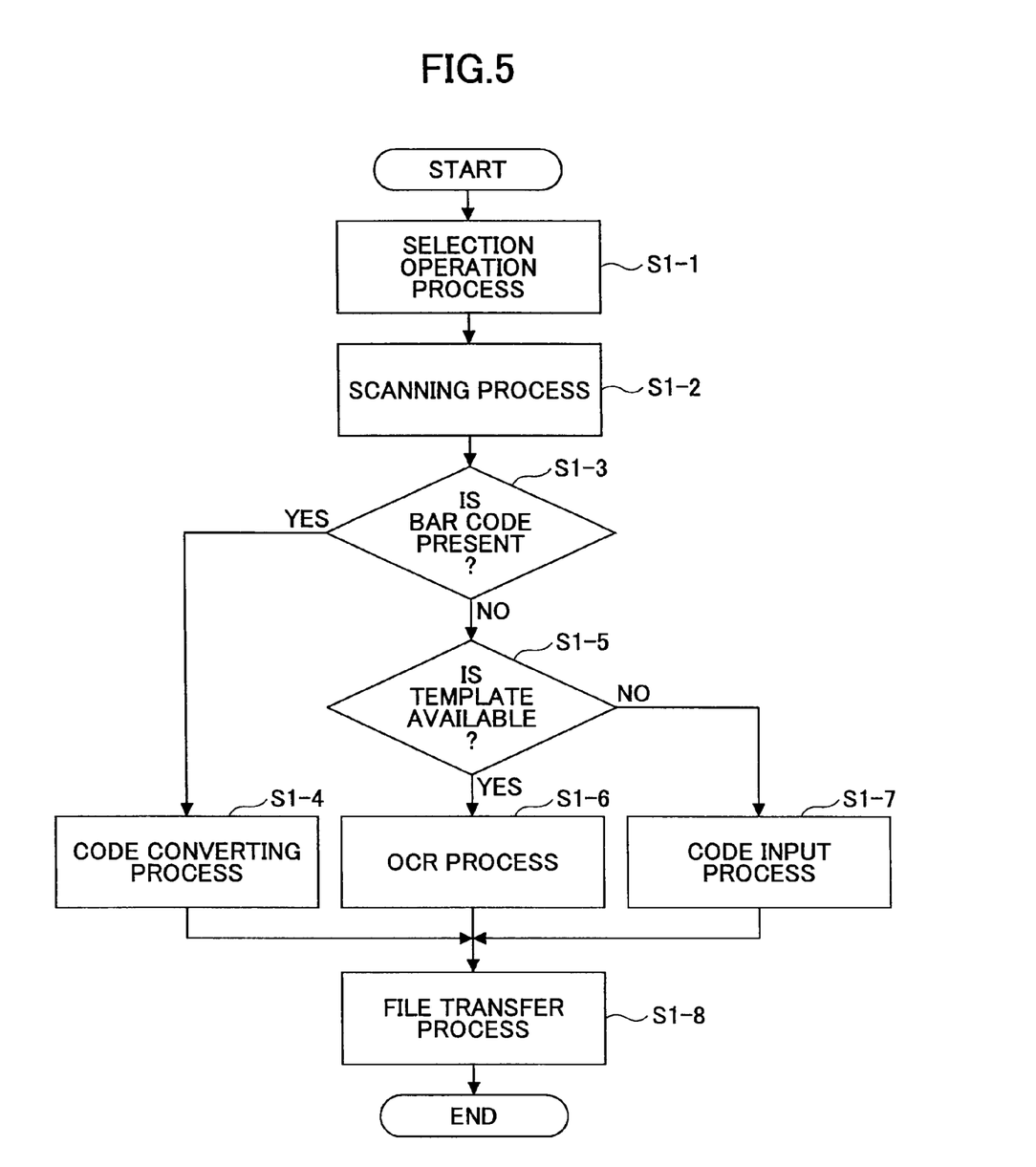
FIG. 5 is a flowchart of a process according to an embodiment of the present invention.
Figure 6:
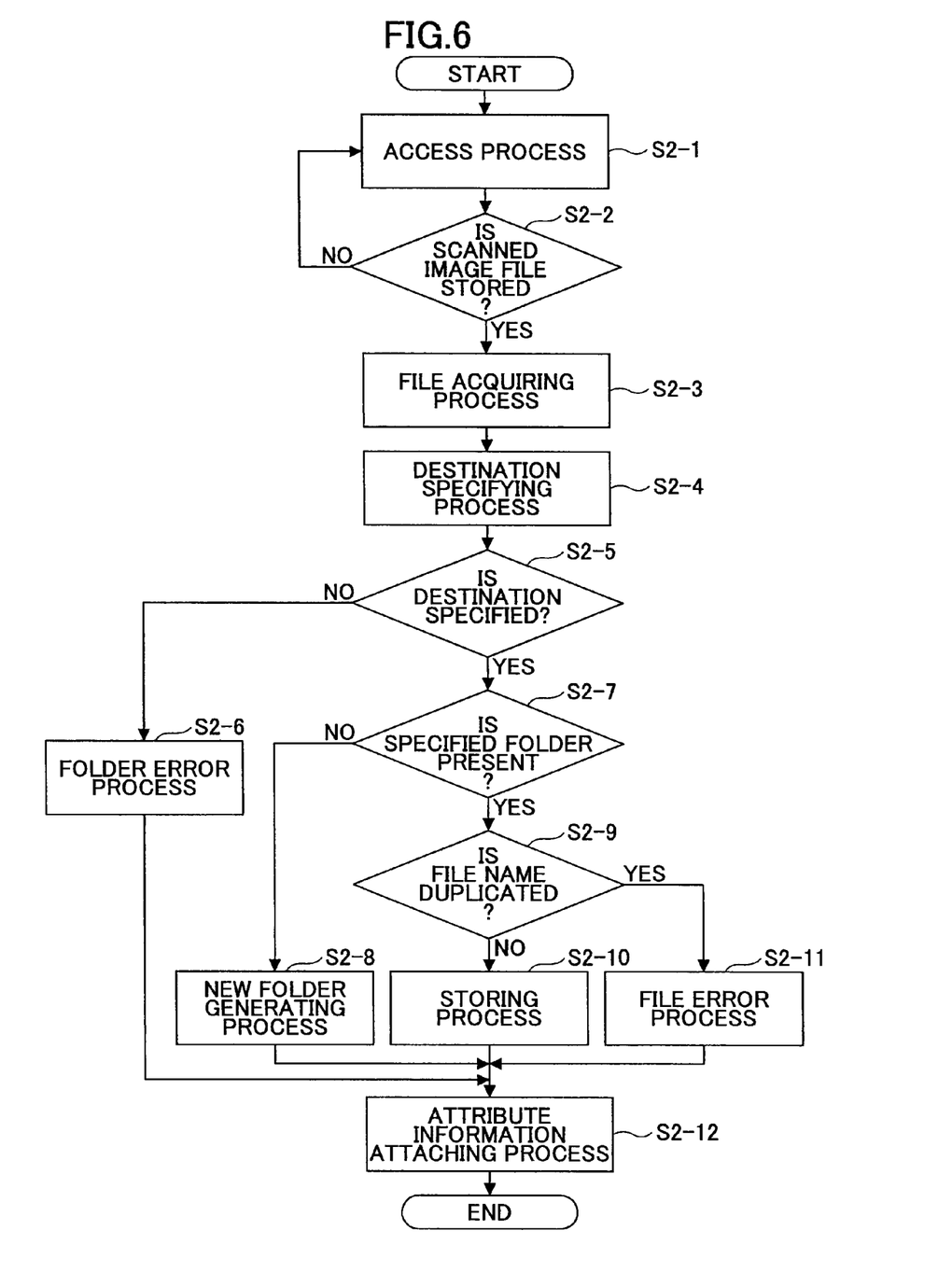
FIG. 6 is a flowchart of another process according to the embodiment of the present invention.

The file generation process performed by the multifunction machine 10 is explained using FIG. 5.

First, the multifunction machine 10 performs a selection operation process (step S1-1). Specifically, the control unit 101 of the multifunction machine 10 displays a menu screen in the user IF unit 105. The menu screen includes a "Copy" button, and a "Scanner reading" button. When the "Scanner reading" button is selected, the control unit 101 calls a document classification selection screen stored in the storage unit 102, and outputs a display screen for prompting a selection of document classification in the user IF unit 105. According to the embodiment, documents are classified into "Plan", "Estimate", and "Drawing". The document classification selection screen containing the selection menu for selecting a document classification is provided to the user IF unit 105.

Next, the multifunction machine 10 performs a scanning process (step S1-2). Specifically, a desired document is selected with the user IF unit 105. Then, if an "Execution" button is pushed, the control unit 101 starts a reading process of reading a paper document with the scanning unit 106. In this way, the control unit 101 acquires image data.

Next, the multifunction machine 10 performs a check process of a bar code (step S1-3). Specifically, the control unit 101 of the multifunction machine 10 searches for a bar code in the image data acquired by the scanning unit 106. When a bar code is detected (YES at step S1-3), the control unit 101 of the multifunction machine 10 performs a code-converting process of the bar code (step S1-4). In this way, the control unit 101 of the multifunction machine 10 acquires the code attached to the document. Then, the control unit 101 attaches a document classification selected by the user IF unit 105 to the code. That is, the control unit 101 attaches the document classification (for example, "Plan") to the code, for example, "101020011001" acquired from the bar code to generate a file name. The file name is added to the image data, and the image data are stored in the storage unit 102 as a scanned image file.

Otherwise, if no bar code is detected (NO at S1-3), the multifunction machine 10 determines whether a template is available (step S1-5). Specifically, the control unit 101 of the multifunction machine 10 compares the scanned image data with an image pattern stored in the template database, and determines whether they are in agreement.

When an image pattern that is in agreement is found, i.e., if a template can be used (YES at step S1-5), the multifunction machine 10 performs an OCR process (step S1-6). Specifically, the control unit 101 of the multifunction machine 10 carries out trimming of a domain specified by the template, and performs character recognition of the domain. In this way, the control unit 101 of the multifunction machine 10 acquires the code attached to the document, and attaches the file name that is constituted by the generated document classification of the image data and the code obtained by the character recognition. Then, the document is stored into the storage unit 102 as a scanned image file.

When there is no image pattern in agreement, and a template cannot be used (NO at step S1-5), the multifunction machine 10 performs a code-input process (step S1-7). Specifically, the control unit 101 of the multifunction machine 10 displays an input screen for inputting a code to be attached to the document by the user IF unit 105. When a code is input using the input screen, the control unit 101 attaches the file name that is constituted by the generated document classification and the input code to the image data, and stores the image data in the storage unit 102 as a scanned image file.

Then, the multifunction machine 10 performs a file transfer process (step S1-8). Specifically, the control unit 101 of the multifunction machine 10 acquires a destination address from the storage unit 102, and transmits a scanned image file to the destination address through the network. According to the embodiment, the image data folder 152 is specified as the destination. Then, the control unit 101 deletes the transmitted scanned image file from the storage unit 102. With the above, the multifunction machine 10 finishes the file generation process.

(File Registration Process)

Next, the file registration process performed by the document management server 20 is described with reference to FIG. 6.

First, the control unit 21 of the document management server 20 accesses the image data folder 152 at a predetermined interval (step S2-1). Then, the control unit 21 of the document management server 20 determines whether the scanned image file is stored (step S2-2).

When the scanned image file is not stored in the image data folder 152 (NO at step 2-2), the document management server 20 stands by until the next access time (step S2-1).

When the scanned image file is stored (YES at step 2-2), the document management server 20 performs an acquiring process (step S2-3), wherein the control unit 21 of the document management server 20 acquires the scanned image file stored in the image data folder 152, and deletes the data stored in the image data folder 152.

Next, the document management server 20 performs a specifying process of specifying a destination (step S2-4). Here, the control unit 21 of the document management server 20 acquires information about the destination using the file name of the scanned image file. Specifically, using the file name conversion table stored in the classification information storage unit 22, the control unit 21 divides the characters of the file name for every digit as shown in FIG. 3. According to the embodiment, the first digit represents the first layer of the folder, the second and third digits represent the second layer, the fourth and the fifth digits represent the third layer, and the sixth, seventh, and the eighth digits represent the fourth layer. In this way, the path in the folder tree is specified using the acquired code, and the destination folder is specified.

If the file name conversion table does not contain the code, i.e., if the destination for the file to be stored cannot be determined (NO at step 2-5), the document management server 20 performs a folder error process (step S2-6). Specifically, the control unit 21 of the document management server 20 stores the scanned image file in an error folder. Further, the control unit 21 provides an error message saying "Folder is not found" to the client terminal 15.

When the code is found in the file name conversion table, i.e., if the destination for the file to be stored is determined (YES at step 2-5), the document management server 20 determines whether the specified destination folder is present (step S2-7). Specifically, the control unit 21 of the document management server 20 determines whether the destination folder is present in the document management folder storage unit 23 using the acquired path.

If it is determined that the destination folder is not present (NO at step 2-7), the document management server 20 stores the scanned image file in a new folder (step S2-8). Specifically, the control unit 21 of the document management server 20 generates the new folder at a layer specified by the acquired path. Then, the control unit 21 stores the scanned image file in the folder of the lowest layer.

If the destination folder is present based on the acquired path (YES at step 2-7), the document management server 20 performs a check process of determining whether the same file name is already present in the folder (step S2-9). Specifically, the control unit 21 of the document management server 20 acquires file name(s) of the file(s) stored in the destination folder, and compares them with the file name of the scanned image file.

If it is determined that the file name is not duplicated (NO at step 2-9), the scanned image file is stored in the folder (step S2-10).

If the duplicate file name is detected (YES at step 2-9), the document management server 20 performs a file error process (step S2-11). Specifically, the control unit 21 of the document management server 20 generates a new file name; for example, if the duplicated file name is "101020011001 Plan", a character string "error" is added such that the new file name reads "101020011001 Plan error". Further, the control unit 21 sends an error message "Duplicated registration" to the client terminal 15.

Next, the document management server 20 performs an attribute information attaching process (step S2-12). Specifically, the control unit 21 of the document management server 20 converts the characters of the file name using the file name conversion table. According to the embodiment, the ninth digit is for the first attribute, the tenth digit is for the second attribute, and the eleventh and the twelfth digits are for the third attribute. Then, the control unit 21 associates the specified attribute information with the corresponding scanned image file stored in the document management folder storage unit 23, and stores the attribute information. With the above, the document management server 20 finishes the file registration process.

As described above, according to the embodiment, the following effectiveness can be acquired.

According to the embodiment, the multifunction machine 10 performs the check process of determining whether the bar code is present (step S1-3). If the bar code is present (YES at step S1-3), the control unit 101 of the multifunction machine 10 performs the code-converting process of the bar code (step S1-4). In this way, the control unit 101 of the multifunction machine 10 can acquire the code attached to the document, and can assign the file name according to the document. Therefore, the user can cut down the time and effort of the registration for document management.

According to the embodiment, the multifunction machine 10 performs the check process of determining whether a template is available (step S1-5). When a template can be used (YES at step S1-5), the multifunction machine 10 performs the OCR process (step S1-6). In this way, the control unit 101 of the multifunction machine 10 can acquire the code attached to the document, and can assign the file name according to the document. Therefore, the user can cut down the time and effort of the registration for document management.

According to the embodiment, the control unit 21 of the document management server 20 accesses the image data folder 152 at a predetermined interval (step S2-1). When the scanned image file is registered in the image data folder 152 (YES at step 2-2), the document management server 20 performs the taking over process (step S2-3). Then, the document management server 20 specifies a destination using the file name of the scanned image file (step S2-4), and stores the scanned image file in the folder (step S2-10). In this way, file classification and filing are automatically carried out without the user being conscious of filing.

According to the embodiment, when the code is not registered in the file name conversion table (NO at step 2-5), the document management server 20 performs the folder error process (step S2-6). In this way, the operator can determine a scanned image file having a problem for correction.

According to the embodiment, when a destination folder is not present (NO at step 2-7), the document management server 20 generates a new folder, and a scanned image file is stored in the new folder (step S2-8). In this way, filing can be efficiently performed.

According to the embodiment, the document management server 20 performs the check process of determining whether the file name is duplicated in a folder (step S2-9). When the duplicate file name is detected (YES at step 2-9), the document management server 20 performs the file error process (step S2-11). In this way, overwriting the existing file can be prevented and an error can be corrected as required.

According to the embodiment, the document management server 20 performs the attribute information attaching process using the file name (step S2-12). In this way, a required file can be efficiently searched for using the attribute information.

In addition, the embodiment may be modified as follows, for example.

According to the embodiment, the code read by the code-converting process or the OCR process of a bar code is used in the file name. Nevertheless, it is possible to beforehand store a code that may be used as the file name in the file name database. When the code-converting process or the OCR process is performed by the multifunction machine 10, the control unit 101 of the multifunction machine 10 searches the file name database. Here, if a file name in agreement is detected, the file name is used. Otherwise, if a file name that agrees is not found in the file name database, the control unit 101 of the multifunction machine 10 extracts file name candidates that have similar character strings from the file name database. Then, the control unit 101 of the multifunction machine 10 outputs the file name candidates to the user IF unit 105 and the user selects one. In this way, a file name can be certainly provided.

According to the embodiment, the code read by the code-converting process or the OCR process of a bar code is used as the file name. Nevertheless, the control unit 101 of the multifunction machine 10 may be configured to output the file name based on the read code as a candidate to the user IF unit 105 such that the user can approve or modify as desired. In this way, a file name can be certainly provided.

According to the embodiment, the image data folder 152 is formed in the hard disk storage of the client terminal 15. Nevertheless, the image data folder 152 may be formed at any place so long as the document management server 20 can access the folder.

Further, the present invention is not limited to these embodiments, but variations and modifications may be made without departing from the scope of the present invention.

The present application is based on Japanese Priority Application No. 2006-311770 filed on Nov. 17, 2006 with the Japanese Patent Office, the entire contents of which are hereby incorporated by reference.

What is claimed is:

1. A document management system, comprising:
a scanning unit for reading a document and generating image data;
an image data storing unit for storing a scanned image file; and
a document management server that includes a destination folder for storing the scanned image file, and a file name conversion table; wherein
the scanning unit
acquires a document identifier assigned to the document using the image data generated by the scanning unit,
assigns a file name to the image data based on the document identifier,
stores the document in the image data storing unit as the scanned image file, and
the document management server
acquires the scanned image file stored in the image data storing unit,
specifies a destination folder based on the document identifier contained in the file name of the scanned image file using the file name conversion table, and
stores the scanned image file in the destination folder.

2. The document management system as claimed in claim 1, wherein the scanning unit specifies a bar code provided on the image of the document, and acquires the document identifier by performing code conversion.

3. The document management system as claimed in claim 1, wherein the scanning unit specifies a character provided on the image of the document, and acquires the document identifier by performing character recognition.

4. The document management system as claimed in claim 1, wherein the document management server generates a new destination folder if no destination folder can be specified based on the document identifier contained in the file name.

5. The document management system as claimed in claim 1, wherein, if the file name is duplicated in the destination folder, the document management server
attaches an error flag indicating a duplication of the file name of the scanned image file,
changes the file name, and
stores the scanned image file.

6. The document management system as claimed in claim 1, wherein the document management server
acquires attribute information based on the document identifier contained in the file name of the scanned image file using the file name conversion table, associates the attribute information with the scanned image file, and stores the attribute information.

7. The document management system according to claim 1, wherein the scanning unit is configured to acquire the document identifier assigned to the document from a bar code detected in the image data generated by the scanning unit.

8. The document management system according to claim 1, wherein the scanning unit is configured to acquire the document identifier assigned to the document by being further configured to compare the image data generated by the scanning unit with image patterns stored in a template database.

9. The document management system according to claim 1, wherein the scanning unit is configured to acquire the document identifier assigned to the document by being further configured to compare the image data generated by the scanning unit with image patterns stored in a template database and to select a portion of the document based on which template is found to match the document in the comparison.

10. The document management system according to claim 1, wherein the scanning unit is configured to acquire the document identifier assigned to the document by being further configured to compare the image data generated by the scanning unit with image patterns stored in a template database, to select a portion of the document based on which particular template is found to match the document in the comparison, and to perform a character recognition process on the selected portion of the document.

11. A document management method for a document management system that includes a scanning unit for reading a document and generating image data, an image data storing unit for storing a scanned image file, and a document management server that includes a destination folder for storing the scanned image file, and a file name conversion table, wherein the scanning unit acquires a document identifier assigned to the document using the image data generated by the scanning unit, assigns a file name to the image data based on the document identifier, stores the scanned image data in the image data storing unit as the scanned image file, and the document management server acquires the scanned image file stored in the image data storing unit, specifies the destination folder based on the document identifier contained in the file name of the scanned image file using the file name conversion table, and stores the scanned image file in the destination folder.

12. The method according to claim 11, wherein the acquiring further comprises acquiring, using the scanning unit, the document identifier assigned to the document from a bar code detected in the image data generated by the scanning unit.

13. The method according to claim 11, wherein the acquiring further comprises acquiring, using the scanning unit, the document identifier assigned to the document by comparing the image data generated by the scanning unit with image patterns stored in a template database.

14. The method according to claim 11, wherein the acquiring further comprises acquiring, using the scanning unit, the document identifier assigned to the document by comparing the image data generated by the scanning unit with image patterns stored in a template database and selecting a portion of the document based on which template is found to match the document in the comparison.

15. The method according to claim 11, wherein the acquiring further comprises acquiring, using the scanning unit, the document identifier assigned to the document by comparing the image data generated by the scanning unit with image patterns stored in a template database, selecting a portion of the document based on which particular template is found to match the document in the comparison, and performing a character recognition process on the selected portion of the document.

16. A non-transitory computer readable storage medium having stored thereon a program that when executed by a computer causes the computer to implement a process of managing a document using a document management system that includes an image data storing unit for storing a scanned image file, a scanning unit for reading a document, generating image data, acquiring a document identifier assigned to the document, assigning a file name generated based on the document identifier to the image data, and recording the image data in the image data storing unit as a scanned image file, a document management server including a destination folder for storing the scanned image file, and a file name conversion table, wherein the document management server acquires the scanned image file stored in the image data storing unit, specifies the destination folder based on the document identifier contained in the file name of the scanned image file using the file name conversion table, and stores the scanned image file in the destination folder.

17. The non-transitory computer readable medium according to claim 16, wherein the acquiring further comprises acquiring, using the scanning unit, the document identifier assigned to the document from a bar code detected in the image data generated by the scanning unit.

18. The non-transitory computer readable medium according to claim 16, wherein the acquiring further comprises acquiring, using the scanning unit, the document identifier assigned to the document by comparing the image data generated by the scanning unit with image patterns stored in a template database.

19. The non-transitory computer readable medium according to claim 16, wherein the acquiring further comprises acquiring, using the scanning unit, the document identifier assigned to the document by comparing the image data generated by the scanning unit with image patterns stored in a template database and selecting a portion of the document based on which template is found to match the document in the comparison.

20. The non-transitory computer readable medium according to claim 16, wherein the acquiring further comprises acquiring, using the scanning unit, the document identifier assigned to the document by comparing the image data generated by the scanning unit with image patterns stored in a template database, selecting a portion of the document based on which particular template is found to match the document in the comparison, and performing a character recognition process on the selected portion of the document.

* * * * *